(12) United States Patent
Kalech et al.

(10) Patent No.: US 10,621,061 B2
(45) Date of Patent: Apr. 14, 2020

(54) COMBINED MODEL-BASED APPROACH AND DATA DRIVEN PREDICTION FOR TROUBLESHOOTING FAULTS IN PHYSICAL SYSTEMS

(71) Applicant: B. G. NEGEV TECHNOLOGIES AND APPLICATIONS LTD., AT BEN-GURION UNIVERSITY, Beer Sheva (IL)

(72) Inventors: Meir Kalech, Modiin (IL); Roni Stern, Modiin (IL); Netanel Hasidi, Rishon Lezion (IL)

(73) Assignee: B. G. Negev Technologies amd Applications Ltd. at Ben-Gurion University, Beer Sheva (IL)

(*) Notice: Subject to any disclaimer, the term of this patent is extended or adjusted under 35 U.S.C. 154(b) by 88 days.

(21) Appl. No.: 15/823,116

(22) Filed: Nov. 27, 2017

(65) Prior Publication Data
US 2018/0173599 A1 Jun. 21, 2018

Related U.S. Application Data

(60) Provisional application No. 62/426,618, filed on Nov. 28, 2016.

(51) Int. Cl.
*G06F 11/00* (2006.01)
*G06F 11/22* (2006.01)
(Continued)

(52) U.S. Cl.
CPC ........ *G06F 11/2257* (2013.01); *G06F 11/008* (2013.01); *G06F 11/079* (2013.01);
(Continued)

(58) Field of Classification Search
CPC .............. G06F 11/079; G06F 11/0709; G06F 11/2257; G06N 7/005; G06N 5/003; G06N 5/04; H04L 41/142; Y04S 10/54
See application file for complete search history.

(56) References Cited

U.S. PATENT DOCUMENTS

| | | | | |
|---|---|---|---|---|
| 5,881,237 A | * | 3/1999 | Schwaller | ............... H04L 43/50 709/224 |
| 6,625,648 B1 | * | 9/2003 | Schwaller | ........... H04L 41/0213 370/230 |

(Continued)

OTHER PUBLICATIONS

Blom, "Diagnosing Intermittent Faults in Telecommunication Networks" Dec. 6, 1992, IEEE, pp. 1-5 (Year: 1992).*

*Primary Examiner* — Bryce P Bonzo
*Assistant Examiner* — Jeison C Arcos
(74) *Attorney, Agent, or Firm* — Roach Brown McCarthy & Gruber, P.C.; Kevin D. McCarthy

(57) ABSTRACT

A method for diagnosing and troubleshooting failures of components of a physical system with low troubleshooting cost, according to which for each component in the system, a Model-Based Diagnosis (MBD) is used for computing the probability of causing a system failure, based on currently observed system behavior or on knowledge about the system's structure. Then the probability of causing a system failure is computed, based on its age and its survival curves. Then, it is determined whether a faulty component C should be fixed or replaced by minimizing future troubleshooting costs, being the costs of the process of diagnosing and repairing an observed failure.

17 Claims, 3 Drawing Sheets

(51) Int. Cl.
  *G06N 7/00*   (2006.01)
  *G06F 11/07*  (2006.01)

(52) U.S. Cl.
  CPC ...... *G06F 11/0766* (2013.01); *G06F 11/0793* (2013.01); *G06F 11/2268* (2013.01); *G06F 11/2273* (2013.01); *G06N 7/005* (2013.01)

(56) References Cited

U.S. PATENT DOCUMENTS

| | | | | |
|---|---|---|---|---|
| 9,240,949 B2* | 1/2016 | McMurry | ............ | H04L 47/127 |
| 9,652,160 B1* | 5/2017 | Piszczek | ............ | G06F 3/0616 |
| 2002/0193920 A1* | 12/2002 | Miller | ............ | G05B 23/0245 |
| | | | | 701/32.9 |
| 2003/0065986 A1* | 4/2003 | Fraenkel | ............ | G06F 11/3006 |
| | | | | 714/47.2 |
| 2003/0086536 A1* | 5/2003 | Salzberg | ............ | H04M 3/22 |
| | | | | 379/15.02 |
| 2004/0078674 A1* | 4/2004 | Raimi | ............ | G06F 17/504 |
| | | | | 714/33 |
| 2004/0220792 A1* | 11/2004 | Gallanis | ............ | G06F 11/3447 |
| | | | | 703/13 |
| 2006/0259271 A1* | 11/2006 | House | ............ | G05B 23/0248 |
| | | | | 702/181 |
| 2007/0226540 A1* | 9/2007 | Konieczny | ............ | G05B 23/0248 |
| | | | | 714/26 |
| 2007/0294000 A1* | 12/2007 | Underdal | ............ | G06N 5/003 |
| | | | | 701/31.8 |
| 2008/0010522 A1* | 1/2008 | Uwatoko | ............ | G06N 7/005 |
| | | | | 714/23 |
| 2008/0294415 A1* | 11/2008 | de Kleer | ............ | G01R 31/318328 |
| | | | | 703/19 |
| 2008/0294578 A1* | 11/2008 | de Kleer | ............ | G06F 11/2257 |
| | | | | 706/12 |
| 2011/0161104 A1* | 6/2011 | Gilbert | ............ | G06N 5/003 |
| | | | | 705/2 |
| 2011/0246093 A1* | 10/2011 | Wood | ............ | G06F 11/008 |
| | | | | 702/34 |
| 2012/0283963 A1* | 11/2012 | Mitchell | ............ | F01D 17/02 |
| | | | | 702/34 |
| 2013/0262931 A1* | 10/2013 | Siddalingesh | ............ | G06F 11/3672 |
| | | | | 714/28 |
| 2015/0036504 A1* | 2/2015 | McMurry | ............ | H04L 47/127 |
| | | | | 370/236 |
| 2019/0152485 A1* | 5/2019 | Sujan | ............ | B60W 30/18181 |

* cited by examiner

COMBINED MODEL-BASED APPROACH AND DATA DRIVEN PREDICTION FOR TROUBLESHOOTING FAULTS IN PHYSICAL SYSTEMS

FIELD OF THE INVENTION

The present invention relates to the field of repairing physical systems. More particularly, the invention relates to a method for online diagnosing and repairing systems that are behaving abnormally.

BACKGROUND OF THE INVENTION

Troubleshooting is the process of diagnosing and repairing a system that is behaving abnormally. Diagnostic and repair actions may incur costs, and traditional troubleshooting algorithms are directed to minimize the costs incurred until the system is repaired.

System failures are prevalent in practically all the engineering fields, including automobiles, robots, information systems, and computer hardware. As systems become more complex, failures often become more common and maintenance costs tend to increase. As a result, automated diagnosis has been studied in the artificial intelligence field for several decades, with substantial progress and successful applications in space crafts, satellite decision support systems, automotive industry and spreadsheets. The output of the diagnosis algorithms is a set of possible diagnoses, where each possible diagnosis is an explanation of the observed system failure. Model-based diagnosis (MBD) is a common approach for diagnosis that uses a model of the diagnosed system to infer diagnoses explaining the observed system failure.

Diagnosis, and in particular root-cause analysis (a root cause is the set of elements of the diagnosed system that their faulty have caused the system failure), is the task of understanding what has happened in the past that has caused an observed failure. Prognosis is the task of predicting what will happen in the future, and when will future failures occur.

Prognosis techniques have been developed for estimating the remaining useful life of components in a system. In particular, survival analysis is a sub-field of statistics, in which various methods have been developed to generate survival curves of components, which are curves that plot the likelihood of a component to survive (not to fail) as a function of the components usage or age.

The first aspect of the invention is directed to a method that diagnoses system failures more accurately by considering both a system model and the survival curves of the system's constituent components. To motivate this combined approach for diagnosis, consider the following example. Assume that a car does not start, and a mechanic inspection of the car observes that the water level in the radiator is low. A possible explanation—a diagnosis—for why the car does not start is that the radiator is not functioning well. There are, however, alternative diagnoses: the ignition system may be faulty or the battery may be empty. Clearly, considering the age of the battery and the survival curve of batteries of the same type can provide valuable input to the mechanic in deciding the most likely diagnosis and consequent next troubleshooting action.

The second aspect of this invention is directed to a method for automated troubleshooting observed system failures over time.

Conventional automated troubleshooting techniques are based on "Decision Theoretic Troubleshooting (DTT)", Heckerman et al., Communications of the ACM, 38(3):49-57, 1995. This decision theoretic approach combines planning and diagnosis, and was applied to a troubleshooting application where a sequence of actions may be needed to perform repairs. For example, a vehicle may need to be disassembled to gain access to its internal parts. To address this problem, prior solutions used a Bayesian network for diagnosis and the AO* algorithm (described in "Principles of artificial intelligence", Nils J Nilsson, Springer, 1982) as the planner. Another solution is using abstractions to improve the efficiency of troubleshooting. Other techniques propose a troubleshooting algorithm aimed at minimizing the breakdown costs, a concept that corresponds roughly to a penalty incurred for every faulty output in the system and for every time step until the system is fixed.

However, DTT and all the above conventional solutions do not incorporate prognosis estimates into the troubleshooting algorithm and did not attempt to minimize costs incurred due to current and future failures.

It is therefore an object of the present invention to provide method for improving decision making for fixing a current fault, while considering also future faults.

It is another object of the present invention to provide method for choosing which action to perform, for fixing system faults.

Other objects and advantages of the invention will become apparent as the description proceeds.

SUMMARY OF THE INVENTION

The present invention is directed to a method for diagnosing and troubleshooting failures of components of a physical system with low troubleshooting cost, which comprises the steps of:
a) for each component C in the system:
   b.1) using a Model-Based Diagnosis (MBD) for computing the probability of causing a system failure, based on currently observed system behavior or on knowledge about the system's structure;
   b.2) computing the probability of causing a system failure, based on its age and its survival curves;
b) choosing whether a faulty component C should be fixed or replaced by minimizing future troubleshooting costs, being the costs of the process of diagnosing and repairing an observed failure.

The troubleshooting may be performed according to:
a) diagnostic information about the relation between sensor data and faults;
b) the likelihood of each component to fail for a given the age of the component, obtained from its corresponding survival curves.

The troubleshooting may be performed by a process that minimizes current troubleshooting costs and maintenance costs of future failing components.

The troubleshooting may also be performed by a troubleshooting agent, being capable of performing sensing and repair actions.

One or more sensors may be deployed in the system, for fault detection.

The troubleshooting agent may perform a sequence of actions that results in a system state, in which all system components are healthy.

The MBD algorithm may use a system model that represents the relation between the system inputs (including sensors) and outputs, and the components behavior.

The present invention is also directed to a method for diagnosing failures of components of a physical system consisting of a plurality of components, comprising the following steps:
a) for each component C in the system:
   a.1) using a Model-Based Diagnosis (MBD) for computing the probability of causing a system failure, based on knowledge about the system's structure;
   a.2) computing the probability of causing a system failure, based on its age and its survival curves;
b) continuously collecting data readings from one or more sensors deployed in the system;
c) upon detecting data reading(s) indicative of system failure, computing for each component C, the probability that the component C caused the system failure; and
d) determining that one or more components having probability higher than a predetermined threshold caused the system failure.

The method may further comprise the following steps:
a) for each component C in the system, computing the probability of causing future system failures, based on its age and its survival curves;
b) computing the troubleshooting costs of the future system failures; and
c) providing indications which currently intact component C should be replaced to minimize the troubleshooting costs.

The present invention is also directed to a system having diagnosing and troubleshooting capability of failures of components of a physical system with low troubleshooting cost, which comprises:
a) one or more processors for performing the following steps for each component C in the system:
   a.1) computing the probability of causing a system failure, based on a Model-Based Diagnosis (MBD) and on currently observed system behavior or on knowledge about the system's structure;
   a.2) computing the probability of causing a system failure, based on its age and its survival curves; and
   a.3) providing indication whether a faulty component C should be fixed or replaced by minimizing future troubleshooting costs, being the costs of the process of diagnosing and repairing an observed failure.

The present invention is also directed to a system for diagnosing failures of components of a physical system consisting of a plurality of components and having one or more sensors deployed in the system, which comprises:
a) one or more processors for performing the following steps for each component C in the system:
   a.1) computing the probability of causing a system failure, based on using a Model-Based Diagnosis (MBD) and on knowledge about the system's structure;
   a.2) computing the probability of causing a system failure, based on its age and its survival curves;
   a.3) continuously collecting data readings from the one or more sensors; upon detecting data reading(s) indicative of system failure, computing for each
   a.4) component C, the probability that the component C caused the system failure; and
   a.5) determining that one or more components having probability higher than a predetermined threshold caused the system failure.

The one or more processors may be further adapted to perform the following steps:
a) for each component C in the system, computing the probability of causing future system failures, based on its age and its survival curves;
b) computing the troubleshooting costs of the future system failures; and
c) providing indications which currently intact component C should be replaced to minimize the troubleshooting costs.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
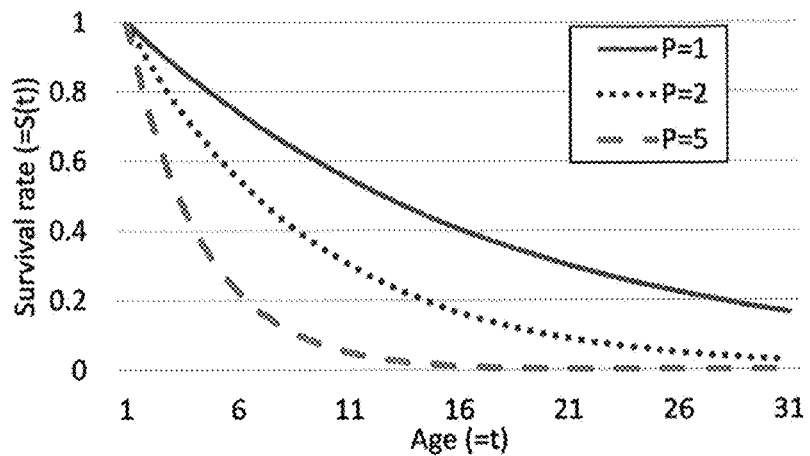
FIG. 1 illustrates an example of exponential survival curves.

The present invention uses prognosis tools, and in particular survival curves, to lower troubleshooting costs. The integration of prognosis and diagnosis is useful for improving troubleshooting costs by using fault predictions from survival curves as priors in an MBD algorithm. It is also useful for developing an anticipatory troubleshooter that chooses whether a faulty component should be fixed or replaced by considering possible future troubleshooting costs.

The present invention proposes an anticipatory troubleshooting model that uses improved diagnosis process that considers both diagnostic information about the relation between sensor data and faults, as well as the likelihood of each component to fail given its age, obtained from the corresponding survival curves. The proposed model effectively integrates prognosis and diagnosis, and in particular survival curves and automated diagnosis algorithms.

The integration of survival curves into the troubleshooting process also allows a more holistic form of troubleshooting referred to here as anticipatory troubleshooting and described below. Troubleshooting is the process of diagnosing and repairing an observed failure. Diagnostic and repair actions may incur costs, such as the time spent in observing internal components and the monetary cost of purchasing a new component to replace a faulty one. Troubleshooting algorithms aim to minimize the costs incurred until the system is fixed.

The present invention uses prognosis tools, and in particular, survival curves, to develop a troubleshooting algorithm that minimizes current troubleshooting costs and future maintenance costs. These maintenance costs include costs due to future failures, which would require additional troubleshooting and perhaps system downtime. This type of troubleshooting, where future costs are also considered, is defined as anticipatory troubleshooting and proposes an effective anticipatory troubleshooting algorithm.

In particular, the proposed troubleshooting algorithm addresses how to choose the most appropriate repair action, given a component that is identified as faulty. For example, repairing a faulty component may be cheaper than replacing it with a new one. On the other hand, a new component is less likely to fail in the near future. The proposed anticipatory troubleshooting algorithm leverages available survival curves to efficiently choose the appropriate repair action. We next describe the proposed anticipatory troubleshooting concept and algorithm formally.

A system is composed of a set of components, denoted COMPS. A component $C \in$ COMPS is either healthy or faulty, denoted by the health predicate $h(C)$ or $\neg h(C)$, respectively. The state of a system, denoted is a conjunction of health literals (a literal is a notation for representing a fixed value), defining for every component whether it is healthy or not. A troubleshooting agent is an agent, being capable of performing sensing and repair actions. The agents' belief about the state of the system, denoted B, is a conjunction of health literals.

It is assumed that the agents knowledge is correct, i.e., if $h(C) \in B \rightarrow h(C) \in \xi$. The agents belief, however, may be incomplete, i.e., there may exists a $C \in$ COMPS such that neither $h(C)$ nor $\neg h(C)$ is in B. A troubleshooting problem arises if the system is identified as faulty, e.g., by some fault detection mechanism. It is assumed that such a mechanism exists, revealing to the agent whether the system is faulty or not.

An action of the troubleshooting agent is a transition function, accepting and potentially modifying both system state $\xi$ and agent's belief B. Two types of actions are considered: sense and repair.

Each action is parametrized by a single component, where $Sense_C$ checks if C is healthy or not, and $Repair_C$ results in C being healthy. Formally, applying $Sense_C$ does not modify and updates B by adding $h(C)$ if $h(C) \in \xi$ or adding $\neg h(C)$ otherwise. Similarly, applying $Repair_C$ adds $h(C)$ to both B and $\xi$, and removes $\neg h(C)$ from B and $\xi$ if it was there.

Definition 1 (Troubleshooting Problem (TP))

A TP is defined by the tuple $P = \langle COMPS, \xi, B, A \rangle$ where
(1) COMPS is the set of components in the system,
(2) $\xi$ is the state of the system,
(3) $B \subseteq \xi$ is the agent's belief about the system state, and
(4) A is the set of actions the troubleshooting agent is able to perform.

A TP arises if $\exists C \neg h(C) \in \xi$. A solution to a TP is a sequence of actions that results in a system state, in which all components are healthy.

A troubleshooting algorithm (TA) is an algorithm for guiding a troubleshooting agent faced with a TP. TAs are iterative: in every iteration the TA accepts the agent's current belief B as an input and outputs a sense or repair action for the troubleshooting agent performs. A TA halts when the sequence of actions it outputted forms a solution to the TP, i.e., when the system is fixed. The solution outputted by a TA $\pi$ to a TP P is denoted by $\pi(P)$. Both sense and repair actions incur a cost. The cost of an action a is denoted by cost(a). The cost of solving P using $\pi$, denoted by cost($\pi$, P), is the sum of the costs of all actions in $\pi(p)$: cost($\pi$, P)$=\Sigma_{a \in \pi(P)}$ cost(a). TAs aim to minimize this cost.

Looking back into the car diagnosis example, in which there are three relevant components that may be faulty: the radiator ($C_1$), the ignition system ($C_2$) and the battery ($C_3$). Assuming that the radiator is the correct diagnosis (i.e., the radiator is really faulty) and the agent knows that the battery is not faulty, then the corresponding system state and agent's belief B are represented by:

$\xi = \{\neg h(C1), h(C2), h(C3)\}$ and $B = \{h(C3)\}$.

Table 1 lists a solution to this TP, in which the agent first senses the ignition system, then the radiator, and finally repairs the radiator. Formally, $\pi(P) = \{Sense_{C2}, Sense_{C1}, Repair_{C1}\}$. If the cost of sense is one and the cost of repair is five, then the troubleshooting costs of this solution is $1+1+5=7$.

Troubleshooting with Survival Functions

If the cost of sense actions is much smaller than the cost of repair actions, then an intelligent troubleshooting algorithm would only repair components that were first identified as faulty as a result of a sense action. This simplifies the troubleshooting process: perform sense actions on components until a faulty component is found, and then repair it. The challenge is which component to sense first.

To address this challenge, efficient troubleshooting algorithms use a Diagnosis Algorithm (DA). A DA outputs one or more diagnoses, where a diagnosis is a hypothesis regarding which components are faulty. Moreover, many DAs output for each diagnosis $\omega$ the likelihood that it is correct, denoted $p(\omega)$. These diagnoses likelihoods can be aggregated to provide an estimate of the likelihood that each component is faulty, denoted $p(C)$. A reasonable troubleshooter can then choose to sense first the component most likely to be faulty.

Most effective existing DAs use some prior knowledge about the diagnosed system to provide accurate diagnoses. Model-Based Diagnosis (MBD) is a classical approach to diagnosis, in which an existing model of the system, along with observations of the system behavior, is used to infer diagnoses. Some MBD algorithms assume a system model that represents the system behavior using propositional logic and use logical reasoning to infer diagnoses that are consistent with system model and observations.

Generally, most MBD algorithms implicitly assume that the system model represents the relation between the system inputs (including sensors) and outputs, and the components behavior. In the example of the present invention, the DA that has been used is based on a Bayesian Network (a BN is a probabilistic graphical model that represents a set of random variables and their conditional dependencies via a Directed Acyclic Graph—DAG) that represents the probabilistic dependency between observations and the system health state. In addition, techniques from survival analysis are used for allowing augmenting such models with information about the age of each component and its implication on the likelihood of components to be faulty.

Integrating Survival Analysis into a DA

Every component C is associated with an age denoted $Age_C$. If $T_C$ is a random variable representing the age in which C will fail, a survival function for C, denoted $S_C(t)$, is the probability that C will survive until the age t component C will not fail before age t). Formally: $S_C(t) = Pr(T_C \geq t)$. Survival functions can be obtained by analysis of the physics of the corresponding system or learned from past data (see for example "Survival analysis of automobile components using mutually exclusive forests" (Eyal et al., IEEE T. Systems, Man, and Cybernetics: Systems, 44(2):246-253, 2014).

FIG. 1 illustrates an example of exponential survival curves. The three survival curves are generated by an exponential decay function $e^{-\lambda \cdot t}$, where $\lambda$ is a parameter and t is the age (the x-axis). The y-axis represents the probability that a component will survive (i.e., will not fail) t time units (e.g., months). The three curves plotted in FIG. 1 correspond to three values of the A parameter.

It is desired to compute the probability of a component C to cause a system failure, given its age and survival function.

In most systems, faulty components may fail intermittently, meaning that a component may be faulty but still not cause a system failure. Thus, the faulty component that caused the system to fail may have been faulty even before time t. To consider this, the probability of a component C of age $Age_C$ to cause the system failure has been estimated by the probability that it has failed any time before the current time. This probability is directly given by $1-S_C(Age_C)$, denoted by $F_C(Age_C)$.

Therefore, for a given component C two estimation should be done for the likelihood that it is correct: one from the MBD algorithm (p(C)) and one from its survival curve ($F_C(Age_C)$). The MBD algorithm's estimate is derived from the currently observed system behavior or knowledge about the system's structure. The survival curve estimation is derived from knowledge about how such components tend to fail over time.

The present invention proposes to combine these estimates to provide a more accurate and more informed diagnostic report. One approach to combine these fault likelihood estimates is by using some weighted linear combination, such that the weights are positive and sum up to one. However, these estimates are fundamentally different: $F_C(Age_C)$ is an estimate given a-priori to the actual fault, while p(C) is computed by the MBD algorithm for the specific fault at hand, taking into consideration the currently observed system behavior.

MBD algorithms often require information about the prior probability distribution of each component to be faulty when computing their likelihood estimates. However, these prior probability distributions are often set to be uniform, although it has been shown that setting such distributions more efficiently can significantly improve diagnostic accuracy. Therefore, the present invention uses the fault likelihood estimation given by the survival curves as prior probability distributions within the likelihood estimation computation done by the MBD algorithm.

Specifically, experiments were made with an MBD that computes diagnoses by applying inference on a Bayesian Network (BN). The BN contains both health variables and other variables such as sensor readings. The values of the observable variables are set, and then the marginal of each health variable is computed by applying an inference algorithm on the BN. The Bayesian reasoning (a method of statistical inference in which Bayes' theorem is used to update the probability for a hypothesis as more information becomes available) is done by the inference algorithm that requires a prior probability.

According to an embodiment of the invention, $S_C(Age_C)$ is used as this prior probability, while normalizing the fault probability over the remaining probability sum. Other ways to integrate survival curves in an MBD are also possible, and the key contribution is that doing so is beneficial.

Figure 2:
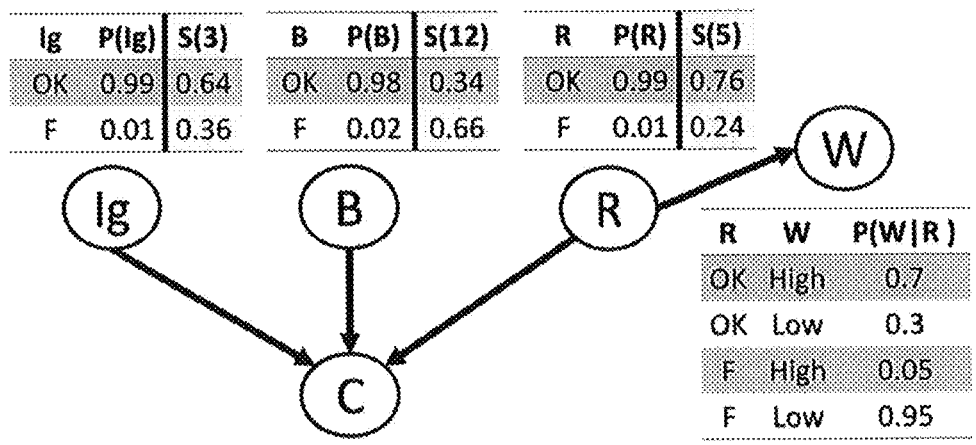
FIG. 2 depicts a possible Bayesian Network (BN) that represents an example of running a car that does not start

Returning back to the example of running a car that does not start. FIG. 2 depicts a possible BN that represents this example. Nodes Ig, B, and R correspond to the health variables for the ignition, battery, and radiator, respectively. W correspond to the water level variable, and C correspond to the observation that the car not starting. The Conditional Probability Tables (CPTs) for all nodes except for C are also illustrated in FIG. 2. The value of C deterministically depends on Ig, B, and R: the car can start only if all components are healthy.

Modeling such dependency (a logical OR) in a BN is trivial. In this example, multiple faults are not allowed (these are mapped to a "N/A" value of C). Assuming that the car does not start (C=False) and the water level is low (W=Low), Bayesian reasoning is applied to obtain the likelihood of each component to be faulty. In this example, the likelihood of Ig, B, or R to be faulty is 0.16, 0.33, and 0.52, respectively. Thus, a troubleshooter would sense R first.

It is assumed that the ages of the ignition (Ig), battery (B), and radiator (R) are 3, 12, and 5, respectively, and that they all follow an exponential survival curve of $e^{-0.09 \cdot t}$. Thus, according to the components age and survival curves, the probability of Ig, B, and R to be faulty are 0.24, 0.66, and 0.36, respectively. Setting these probabilities instead of the original health nodes' prior probability distributions is shown in FIG. 2 in the S(X) columns of the CPTs. Setting these prior probability distributions dramatically affects the result of the Bayesian reasoning, where the current probability of Ig, B, and R to be faulty is 0.16, 0.56, and 0.28, respectively. As a result, a troubleshooter that is aware of both BN and survival curves would choose to sense the battery (rather than the radiator).

Anticipatory Troubleshooting

The present invention proposes an anticipatory troubleshooting algorithm, which is able to reason about both current and future failures. To, reason about failures over time, statistical tools are incorporated from survival analysis that allows predicting when a failure is likely to occur. Incorporating this prognostic information in a troubleshooting algorithm allows better fault isolation and more efficient decision making in which repair actions to employ to minimize troubleshooting costs over time.

The main benefit of using survival functions in the context of troubleshooting is in the ability to reason about future failures, with the goal of minimizing troubleshooting costs over time.

If $[0, T_{limit}]$ is the time period in which it is required to minimize troubleshooting costs, during this time period, components in the system may fail. When the system fails, a troubleshooting process is initiated, performing sense and repair actions until the system is fixed. The target function to be minimized is the sum of costs incurred due to actions performed by the troubleshooting agent within the time period $[0, T_{limit}]$. This sum of troubleshooting costs is referred to as the long-term troubleshooting cost. a troubleshooting algorithm that aims to minimize this cost is referred to as an anticipatory troubleshooting algorithm.

When there is only a single sense action and a single repair action, there is no difference between an anticipatory troubleshooting and a troubleshooting algorithm only aiming to minimize the current troubleshooting costs. The difference between traditional troubleshooting and anticipatory troubleshooting is meaningful when there are multiple repair actions. In other words, after the troubleshooting algorithm identifies which component is faulty, the troubleshooter needs to decide which repair action to use to repair it.

Fix Vs. Replace Actions

A setting, where there are two possible repair actions is called Fix and Replace. Applying a Replace(C) action means that the troubleshooting agent replaces C with a new one. Applying Fix(C) action means that the troubleshooting agent fixes C without replacing it. Both fix and replace are repair actions, in the sense that after performing them, the component is healthy and the agent knows about it, i.e., replacing ¬h(C) with h(C) in both the system state and the agent's belief.

However, Fix is expected to be cheaper than Replace. Also, after replacing a component, its ability to survive is expected to be significantly higher than that after it has been fixed, since the replaced component is new.

If $S_C(t, Age_C)$ be the survival curve of C after it was fixed at age AgeC, i.e., the probability of C to survive t time units after it was fixed, given that it was fixed at age $Age_C$.

$$S_C(t, Age_C) = Pr(T_C \geq t + Age_C | C \text{ fixed at age } AgeC)$$

Such a survival function is called an after-fix survival function. The expected differences relations between fix and replace are:

$$\forall C \in \text{COMPS}: \text{cost}(\text{Fix}(C)) < \text{cost}(\text{Replace}(C)) \qquad (1)$$

$$\forall t \in [0, T_{limit}] \forall C \in \text{COMPS}: SC(t, Age_C) < S_C(t) \qquad (2)$$

Fixing a faulty component seems to be cheaper, but may result in future faults being more frequent. This embodies the main dilemma in anticipatory troubleshooting: weighing current troubleshooting costs (where Fix is preferable) against potential future troubleshooting costs (where Replace is preferable).

Choosing the Appropriate Repair Action

An preferable approach to choose which repair action to perform is to discretize the time period $[0, T_{limit}]$, model the problem as a Markov Decision Problem (MDP), and apply an off-the-shelf MDP solver, as described below.

Discretization

The time limit $[0, T_{limit}]$ is partitioned to a non-overlapping set of equal-sized time ranges $T = \{T_0, \ldots, T_n\}$. Each $T_i$ is referred to as a time step, and $\Delta t$ is the size of each time step.

MDP Modeling

An MDP is defined by a state space S, a set of actions A, a reward function r(s,a), and a transition function tr(s,a,s'). a state in the state space is defined by a tuple s=(Ti, C, Curves, Ages), representing a state in which component C was diagnosed as faulty at time step $T_i$, where Curves and Ages are vectors representing the survival curves and ages of all components in COMPS. C can be null, representing a state in which no component was faulty at time $T_i$.

If only a single fault scenarios are considered (i.e., at most, one component is fault at every time step), states for time $T_{n+1}$ are terminal states. The set of actions A consists of three actions: Replace(C), Fix(C), and no-op (no-op represents not doing any action). The reward function R(s,a) is minus the cost of the executed action, where the no-op action costs zero. The state transition function is as follows:

After any action, a state for time step $T_i$ will transition to a state for time step $T_{i+1}$.

The MDP transition function Tr(s,a,s'), which is a function that returns the probability of reaching state s' after performing action a at state s, is defined as follows:

If s=(Ti, C, Curves, Ages) and s'=(Tj, C', Curves', Ages'). The values of Tj, Curves', and Ages' are set deterministically by s and a: Tj=Ti+1, Curves' is only updated after a Fix(C) action (replacing C's survival function with its after-fix curve), and Ages' consists of all components being older by one time step, except for when C is replaced (in which case, the age of C is set to zero). The uncertainty in state transition is which component, if any, will be faulty in the next time step.

If $S_{C'}$ and $Age_{C'}$ be the survival curve and age of C' according to Curves', Ages', then the probability that C' will fail at a specific time range Tj given its survival curve is:

$$Pr(T_C \in Tj) = S_C(Age_{C'} - \Delta t) - S_C(Age_{C'})$$

which is a standard computation in survival analysis: the probability of surviving before Tj (when the age of C' was AgeC'−Δt) minus the probability of surviving until Tj (when the age of C' is $Age_{C'}$).

Solving the MDP

The state space of this MDP is exponential in the number of time steps reasoned about (n).

A decision rule called Decision Rule 1 (DR1) that roughly corresponds to reasoning about a single level of this MDP state space has been implemented. If $C_{replace}$=cost(Replace(C)), $C_{fix}$=cost(Fix(C)), and $T_{left}$ be the time left until $T_{limit}$, then following DR1 is to replace a faulty component C iff the following inequality holds:

$$C_{replace} + (1 - S_C(T_{left})) \cdot C_{replace} \leq C_{fix} + (1 - S_C(T_{left}, Age_C)) \cdot C_{replace} \qquad (3)$$

DR1 has the following property:

Proposition 1

DR1 is optimal if the following holds:
(1) a component will not fail more than twice in the time range [0, Tlimit];
(2) a component can be fixed at most once;
(3) a replaced component will not be fixed in the future;
(4) components fail independently.

Experimental Results

To evaluate the proposed algorithms, two sets of experiments have been performed: "one-shot" experiments, in which a single TP is solved and "longterm" experiments, in which troubleshooting costs are accumulated.

Figure 3:
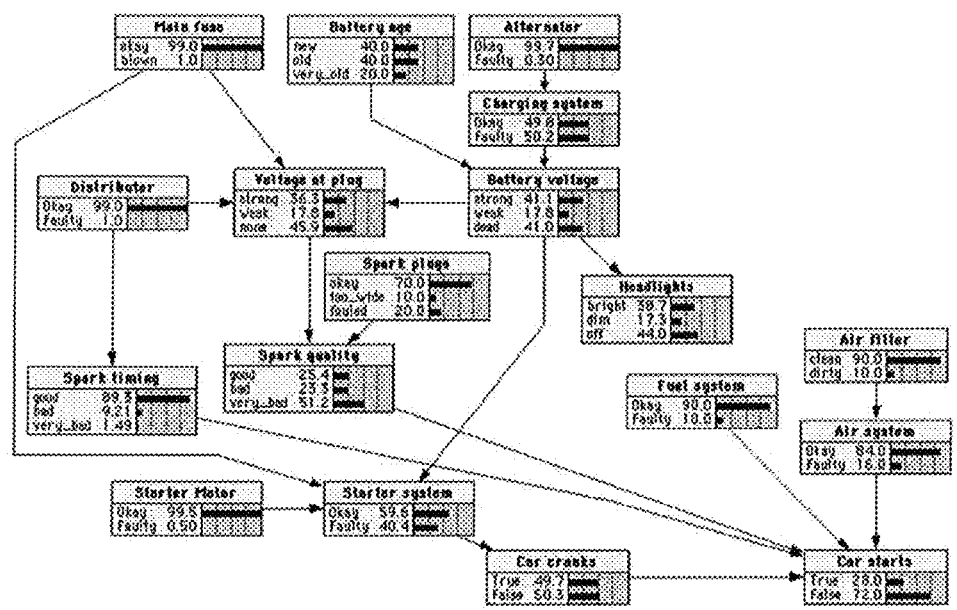
FIG. 3 illustrates graphical representation of car diagnosis system.

Experiments were performed over two systems, modeled using a Bayesian network (BN) following the standard use of BN for diagnoses. The first system, denoted S1, represents a real world Electrical Power System. The BN was generated automatically from formal design and is publicly available. It has 26 nodes, 6 of which are health nodes. The second system, denoted S2, is the "CAR DIAGNOSIS 2" network from the library of benchmark BN made available by Norsys (www.norsys.com/netlib/CarDiagnosis2.dnet). This second system represents a network for diagnosing a car that does not start, based on spark plugs, headlights, main fuse, etc. It contains 18 nodes, 7 of which are health nodes. A graphical representation of S2 is illustrated in FIG. 3.

Survival Curves and Component Ages

A standard exponential curve (defined above and illustrated in FIG. 1) with λ=0.09. Exponential curves are fundamental parametric models used in the survival analysis.

The age of each component is set to be $Age_{init}$ plus a random number between zero and $Age_{diff}$, where $Age_{init}$ is a constant, set arbitrarily to 0.3 and $Age_{diff}$ is a varied parameter in the experiments. The purpose of the $Age_{diff}$ parameter is to control the possible impact of considering the components' survival functions: a small $Age_{diff}$ results in all components having almost the same age, and thus the survival curves do not provide significant information to distinguish between which component is more likely to be faulty.

One-Shot Experiments

In this set of experiments random TPs (details below) were generated and compared the performance of four TAs:
(1) Random, which chooses randomly which component to sense;
(2) BN-based, which chooses to sense the component most likely to be faulty according to the BN;
(3) Survival-based, which chooses to sense the component most likely to be faulty according to its survival curve and age;

(4) Hybrid, which chooses to sense the component most likely to be faulty taking into consideration both BN and survival curve.

Performance of a TA was measured by the troubleshooting costs incurred until the system is fixed. Since only single fault scenarios have been considered, the cost of the single repair action performed in each of these experiments were omitted, as all algorithms had spent this cost.

Each TP was generated with a single faulty health node as follows:

The value of non-health nodes in the BN that do not depend on any other node were set randomly according to their priors. These nodes a referred to as control nodes. Then, the age of each component was set as mentioned above, i.e., by sampling uniformly within the range of $[Age_{init}, Age_{init}+Age_{diff}]$. Then, the CPT of every health node was modified to take into account the survival curve (i.e., the prior of being healthy was set to SC ($Age_C$)). Next, the marginal probability of each component to be faulty in this modified BN has been computed, and a single component to be faulty was chose according to these computed probabilities. Then, the BN values for all remaining nodes (nodes that are not control or health node) were sampled, while setting the values of the already set nodes. These nodes are called the sensor nodes, and a subset of them were revealed to the DA.

Figure 4A:
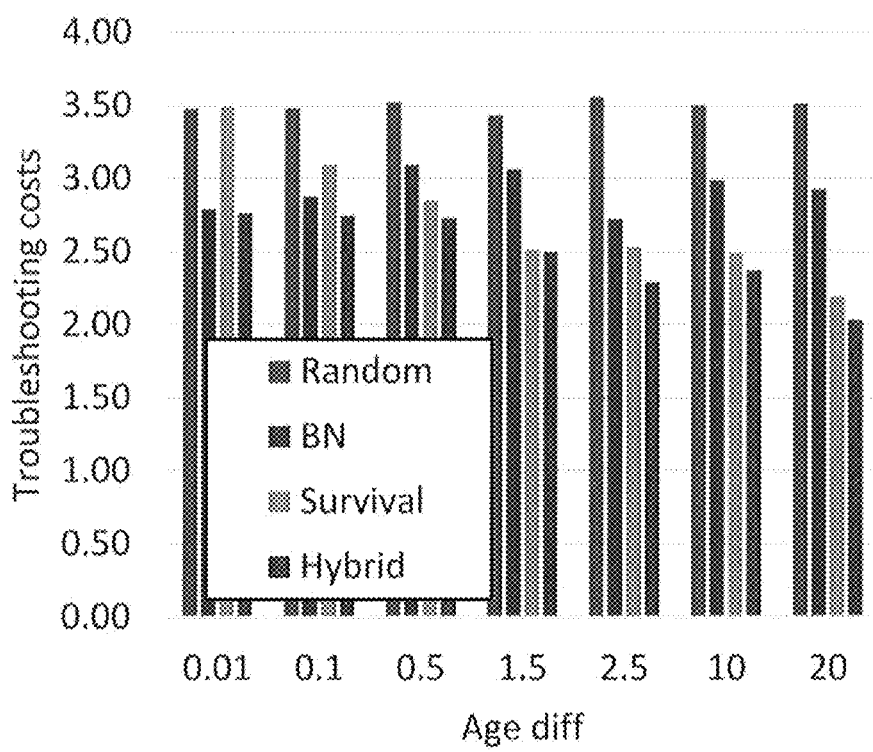
FIGS. 4A and 4B show the troubleshooting cost for each of the algorithms, for different values of the $Age_{diff}$ parameters, for a real world Electrical Power System and car diagnosis system, respectively.
Figure 4B:
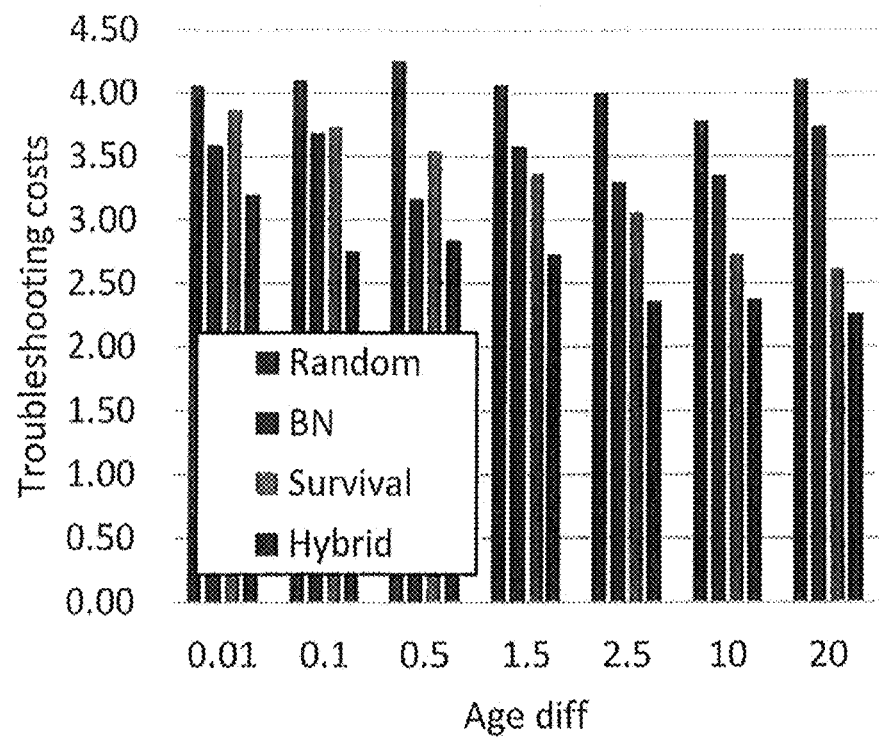

FIGS. 4A and 4B show the troubleshooting cost for each of the algorithms, for different values of the $Age_{diff}$ parameters, for a real world Electrical Power System (S1) and car diagnosis system (S2), respectively. AU results are averaged over 50 instances. It can be seen that the proposed Hybrid TA outperforms all baseline TAs, thereby demonstrating the importance of considering both survival curves and MBD. It can also be seen that, as $Age_{diff}$ grows, the performance of Survival improves, since the components' age differ more, and thus considering it is more valuable. When $Age_{diff}$ is minimal, the performance of Survival is similar to Random and worse than BN.

BN performed better, since it was provided with evidence—the values of some sensor nodes (in the case of S1 9 sensor nodes have been revealed and for S2 2 sensor nodes have been revealed). Experiments were also made with different numbers of revealed nodes. As expected, revealing more nodes improves the performance of both BN and Hybrid.

The results demonstrate that Hybrid is more robust than both Survival and BN, and is either equal or outperforms them across all varied parameter.

Long-Term Experiments

In this set of experiments random TPs were generated over a period of 28 months (i.e., $T_{limit}=28$), while choosing when each component fails according to its survival function. In each experiment one of the following TAs has been used to solve the TPs that arise:

(1) Always Fix (AF), in which faulty components are repaired using the Fix action;
(2) Always Replace (AR), in which faulty components are repaired using the Replace action;
(3) Hybrid, in which DR1 has been used to choose the appropriate repair action.

The performance of each algorithm is measured by the sum of troubleshooting costs incurred when solving all the TPs that arose. Since the focus of these experiments is to study the Fix vs. Replace dilemma, the costs incurred were omitted clue to Sense action, and only the cost the repair action used in every troubleshooting session was measured (i.e., $C_{replace}$ or $C_{fix}$).

To sample when a component will fail after it was fixed, and to compute the Hybrid TA, an after-fix survival function (Sc (t, $Age_C$)) has been required. Such functions can be given by domain experts or learned from past data. Then, the following after-fix survival function has been used:

$$S_C(t, AgeC) = (SC(t))^P$$

where P is a parameter called "the fix punish factor". This after-fix survival curve holds the intuitive requirement that a replaced component is more likely to survive longer than a component that was fixed (Eq. 2). The punish-factor parameter P controls the difference between the after-fix and the regular survival function.

FIG. 1 shows the survival curves after a punish factor of 2 and 5. Another important parameter in this set of experiments is the ratio between $C_{replace}$ and $C_{fix}$. This parameter is referred to as the cost ratio parameter.

Figure 5:
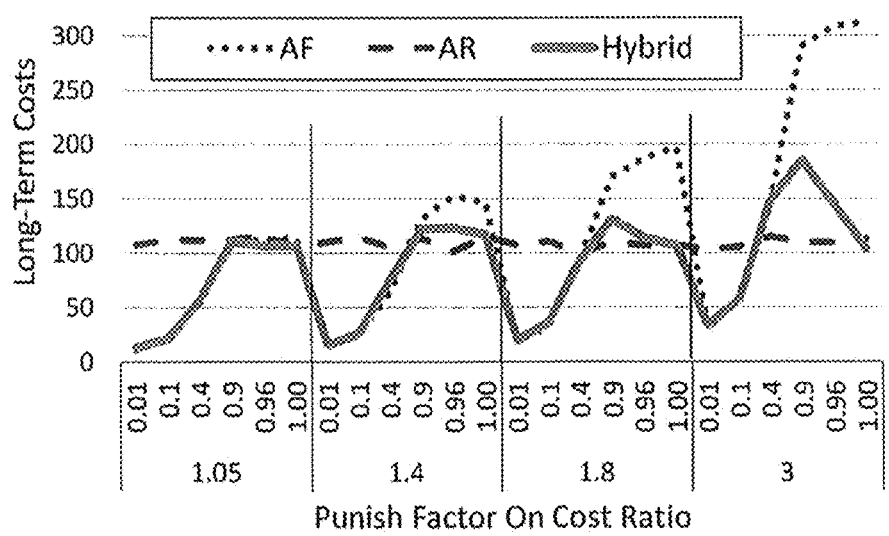
FIG. 5 shows the results of the long-term experiments, on a car diagnosis system.

FIG. 5 shows the results of the long-term experiments, on system S1. The x-axis shows different cost ratios, in buckets of punish-factor values. The y-axis shows the long-term troubleshooting costs. All results are averaged over 50 instances. It can be seen that when the cost ratio is small, then Fix is significantly cheaper then Replace, and thus the Always Fix (AF) algorithm performs best. Similarly, when the punish factor is very high, a fixed component is much more likely to fail than a replaced one, thus Always Replace (AR) algorithm performs best. The Hybrid algorithm is able to successfully choose when to replace or fix in most parameter combinations. The same trends were also observed for system S2. Thus, even though the assumptions in which DR1(=Hybrid) is optimal do not hold in the experiments made (e.g., a component may have more than two faults), it can be seen that using it allows an effective balance between AF and AR.

The above examples and description have of course been provided only for the purpose of illustration, and are not intended to limit the invention in any way. As will be appreciated by the skilled person, the invention can be carried out in a great variety of ways, employing more than one technique from those described above, other than used in the description, all without exceeding the scope of the invention.

The invention claimed is:

1. A method for diagnosing and troubleshooting failures of components of a physical system with low troubleshooting cost, comprising:
   a) for each component C in said system:
      a.1) using a Model-Based Diagnosis (MBD) for computing a first fault likelihood estimate being the probability of causing a system failure, based on currently observed system behavior or on knowledge about the system's structure;
      a.2) computing a second fault likelihood estimate being the probability of causing a system failure, based on its age and on prior probability distributions and fault likelihood estimation given by its survival curves;
      a.3) using the fault likelihood estimation given by said survival curves as prior probability distributions within the likelihood estimation computation done by said MBD by combining said first and second fault likelihood estimates using a weighted linear combination, such that the weights are positive and sum up to one;
   b) choosing whether a faulty component C should be fixed or replaced by minimizing the future sum of troubleshooting costs, being the costs of the process of diagnosing and repairing an observed failure; and c) upon detecting that said physical system fails, initiating a troubleshooting process by performing sense and repair actions until the system is fixed.

2. The method according to claim 1, wherein troubleshooting is performed according to:
   d) diagnostic information about the relation between sensor data and faults;
   e) the likelihood of each component to fail for a given the age of said component, obtained from its corresponding survival curves.

3. The method according to claim 1, wherein troubleshooting is performed by a process that minimizes current troubleshooting costs and maintenance costs of future failing components.

4. The method according to claim 1, wherein troubleshooting is performed by a troubleshooting agent, being capable of performing sensing and repair actions.

5. The method according to claim 1, further comprising deploying one or more sensors in the system, for fault detection.

6. The method according to claim 1, wherein the troubleshooting agent performs a sequence of actions that results in a system state, in which all system components are healthy.

7. The method according to claim 1, wherein the MBD algorithm uses a system model that represents the relation between the system inputs (including sensors) and outputs, and the components behavior.

8. A method for diagnosing failures of components of a physical system consisting of a plurality of components, comprising:
   a) for each component C in said system:
      a.1) using a Model-Based Diagnosis (MBD) for computing a first fault likelihood estimate being the probability of causing a system failure, based on knowledge about the system's structure;
      a.2) computing a second fault likelihood estimate being the probability of causing a system failure, based on its age and on prior probability distributions and fault likelihood estimation give by its survival curves;
      a.3) using the fault likelihood estimation given by said survival curves as prior probability distributions within the likelihood estimation computation done by said MBD by combining said first and second fault likelihood estimates using a weighted linear combination, such that the weights are positive and sum up to one;
   b) continuously collecting data readings from one or more sensors deployed in said system;
   c) upon detecting data reading(s) indicative of system failure, computing for each component C, the probability that said component C caused said system failure; and
   d) determining that one or more components having probability higher than a predetermined threshold caused said system failure.

9. The method according to claim 1, further comprising:
   e) for each component C in said system, computing the probability of causing future system failures, based on its age and its survival curves;
   f) computing the troubleshooting costs of said future system failures; and
   g) providing indications which currently intact component C should be replaced to minimize said troubleshooting costs.

10. A system having diagnosing and troubleshooting capability of failures of components of a physical system with low troubleshooting cost, comprising:
   a) one or more processors for performing the following steps for each component C in said system:
      a.1) computing a first fault likelihood estimate being the probability of causing a system failure, based on a Model-Based Diagnosis (MBD) and on currently observed system behavior or on knowledge about the system's structure;
      a.2) computing a second fault likelihood estimate being the probability of causing a system failure, based on its age and on prior probability distributions and fault likelihood estimation given by its survival curves; and
      a.3) using the fault likelihood estimation given by said survival curves as prior probability distributions within the likelihood estimation computation done by said MBD by combining said first and second fault likelihood estimates using a weighted linear combination, such that the weights are positive and sum up to one;
      a.4) providing indication whether a faulty component C should be fixed or replaced by minimizing the future sum of troubleshooting costs, being the costs of the process of diagnosing and repairing an observed failure; and
      a.5) upon detecting that said physical system fails, initiating a troubleshooting process by performing sense and repair actions until the system is fixed.

11. The system according to claim 10, in which troubleshooting is performed according to:
   b) diagnostic information about the relation between sensor data and faults; and
   c) the likelihood of each component to fail for a given the age of said component, obtained from its corresponding survival curves.

12. The system according to claim 10, in which troubleshooting is performed by a process that minimizes current troubleshooting costs and maintenance costs of future failing components.

13. The system according to claim 10, in which troubleshooting is performed by a troubleshooting agent, being capable of performing sensing and repair actions.

14. The system according to claim 10, further comprising one or more sensors deployed in the physical system, for fault detection.

15. The system according to claim 10, deploying the troubleshooting agent performs a sequence of actions that results in a system state, in which all system components are healthy.

16. The system according to claim 10, deploying the MBD algorithm uses a system model that represents the relation between the system inputs (including sensors) and outputs, and the components behavior.

17. A system for diagnosing failures of components of a physical system consisting of a plurality of components and having one or more sensors deployed in said system, comprising:
   a) one or more processors for performing the following steps for each component C in said system:
      a.1) computing a first fault likelihood estimate being the probability of causing a system failure, based on using a Model-Based Diagnosis (MBD) and on knowledge about the system's structure;
      a.2) computing a second fault likelihood estimate being the probability of causing a system failure, based on its age and on prior probability distributions and fault likelihood estimation given by its survival curves;

a.3) using the fault likelihood estimation given by said survival curves as prior probability distributions within the likelihood estimation computation done by said MBD by combining said first and second fault likelihood estimates using a weighted linear combination, such that the weights are positive and sum up to one;

a.4) continuously collecting data readings from said one or more sensors; a.11) upon detecting data reading(s) indicative of system failure, computing for each component C, the probability that said component C caused said system failure; and a.5) determining that one or more components having probability higher than a predetermined threshold caused said system failure.

* * * * *